(12) United States Patent
Rogers et al.

(10) Patent No.: US 11,924,580 B2
(45) Date of Patent: Mar. 5, 2024

(54) GENERATING REAL-TIME DIRECTOR'S CUTS OF LIVE-STREAMED EVENTS USING ROLES

(71) Applicant: INTEL CORPORATION, Santa Clara, CA (US)

(72) Inventors: Brian Rogers, Aloha, OR (US); Nelson Kidd, Camas, WA (US); Priya Balasubramanian, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 16/869,212

(22) Filed: May 7, 2020

(65) Prior Publication Data

US 2020/0267427 A1 Aug. 20, 2020

(51) Int. Cl.
| | |
|---|---|
| *H04N 7/15* | (2006.01) |
| *G06V 10/44* | (2022.01) |
| *G06V 10/764* | (2022.01) |
| *G06V 20/40* | (2022.01) |
| *G06V 40/16* | (2022.01) |
| *G06V 40/18* | (2022.01) |
| *G10L 15/22* | (2006.01) |
| *G10L 25/63* | (2013.01) |
| *G11B 27/031* | (2006.01) |
| *G11B 27/34* | (2006.01) |
| *H04N 21/234* | (2011.01) |

(52) U.S. Cl.
CPC .............. *H04N 7/15* (2013.01); *G06V 10/454* (2022.01); *G06V 10/764* (2022.01); *G06V 20/46* (2022.01); *G06V 40/174* (2022.01); *G06V 40/18* (2022.01); *G10L 15/22* (2013.01); *G10L 25/63* (2013.01); *G11B 27/031* (2013.01); *G11B 27/34* (2013.01); *H04N 21/23424* (2013.01)

(58) Field of Classification Search
CPC ....... G11B 27/031; G11B 27/28; G10L 15/22; G10L 25/63; G06V 20/46; G06V 40/174; G06V 10/454; H04N 21/84; H04N 7/15; H04N 21/23418; H04N 21/233; H04N 21/21805; H04N 21/23424; H04N 21/2668
USPC .......................................... 348/14.01–14.16
See application file for complete search history.

(56) References Cited

U.S. PATENT DOCUMENTS

| | | | | |
|---|---|---|---|---|
| 10,887,628 | B1 * | 1/2021 | Flachsbart | ............ G06V 20/46 |
| 2003/0234859 | A1 * | 12/2003 | Malzbender | .............. G06T 7/55 |
| | | | | 348/14.05 |
| 2008/0297589 | A1 * | 12/2008 | Kurtz | ...................... H04N 7/15 |
| | | | | 348/E7.083 |
| 2015/0147049 | A1 * | 5/2015 | Eronen | ................. G06F 18/256 |
| | | | | 386/285 |

(Continued)

*Primary Examiner* — Melur Ramakrishnaiah
(74) *Attorney, Agent, or Firm* — Hanley, Flight & Zimmerman, LLC

(57) ABSTRACT

An example apparatus for generating real-time director's cuts includes a number of cameras to capture videos of a plurality of participants in a scene. The apparatus also includes a number of microphones to capture audio corresponding to each of the number of participants. The apparatus further includes a role-centric evaluator to receive views-of-participants and a role for each of the participants and rank the views-of-participants based on the roles. Each of the views-of-participants are tagged with one of the participants. The apparatus further includes a view broadcaster to display a highest ranking view-of-participant stream.

24 Claims, 10 Drawing Sheets

(56) References Cited

U.S. PATENT DOCUMENTS

2017/0060828 A1\* 3/2017 Rainisto ................ G06F 40/169
2019/0215464 A1\* 7/2019 Kumar .................... H04N 7/08

\* cited by examiner

GENERATING REAL-TIME DIRECTOR'S CUTS OF LIVE-STREAMED EVENTS USING ROLES

BACKGROUND

Some video systems may use audio or video to detect speakers. For example, such systems may then display a video stream of a detected speaker.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
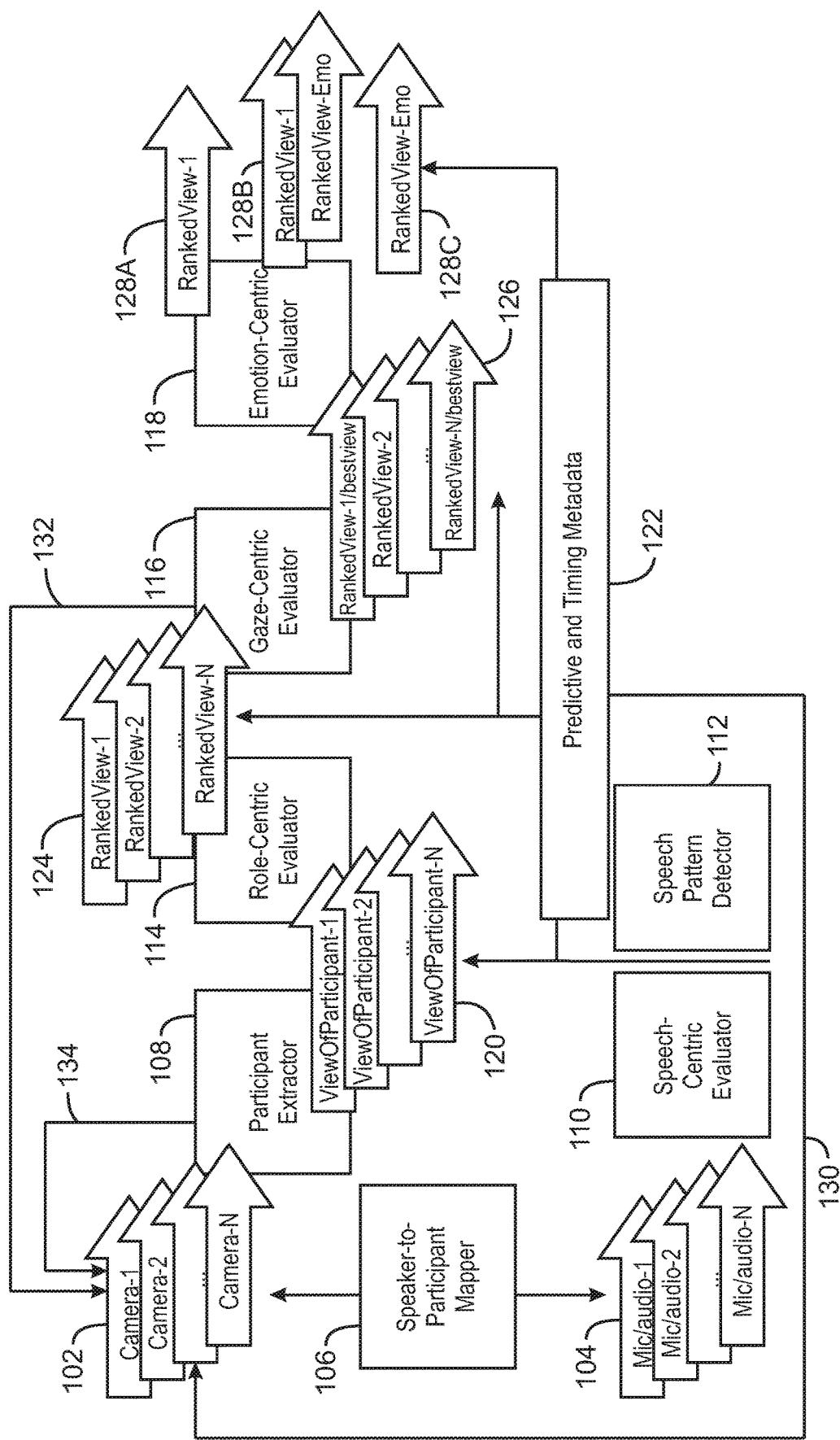
FIG. 1 is a block diagram illustrating an example system for generating real-time director's cuts using detected behavior.

Some video systems may use audio or video to create director's cuts of two or more video streams. As used herein, a director's cut is an edited combination of two or more captured video streams of one or more subjects. For example, the subjects may be speakers. As one example, video conferencing systems may create director's cuts focused on a current speaker. For example, multiple microphones or microphone arrays can be used to perform beamforming to determine who is actively speaking. In another example, a system can determine an active speaker using artificial intelligence (AI) methodologies to track facial features and lip movement. However, both of these solutions may only detect that someone is speaking after they have started talking. Therefore, due to processing time and the time spent waiting to collect more data to avoid false positives, a person may only show up on screen after they already begin talking. This lag in displaying a current speaker may harm the quality of the experience of audiences watching the speakers. For example, latencies of two to five seconds and higher may be observed in existing technologies in order to detect a change in speakers and switch between video views of the speakers. Moreover, such solutions may assume that a current speaker is the correct person to receive camera time. Contextually speaking, however, this may not be always correct. For example, a speaker may be speaking out of turn may nonetheless be awarded camera time for such behavior using current solutions. In addition, such solutions may use wide-shots and slow-pans when transitioning between one speaker and another, regardless of context.

The present disclosure relates generally to techniques for generating real-time director's cuts. As used herein, a real-time director's cut refers to a video stream that is edited and broadcasted in real-time. Specifically, the techniques described herein include an apparatus, method and system for automatically generating real-time director's cuts. An example apparatus includes a number of cameras to capture videos of a number of participants in a scene. The apparatus also includes a number of microphones to capture audio corresponding to each of the number of participants. The apparatus further includes a role-centric evaluator to receive views-of-participants and a role for each of the participants and rank the views-of-participants based on the roles. Each of the views-of-participants are tagged with one of the participants. The apparatus also further includes a view broadcaster to display a highest ranking view-of-participant stream.

The techniques described herein thus enable faster and more responsive switch time in a generated real-time director's cut from one participant to a different participant. In addition, the techniques described herein include a process for creating the real-time director's cut in an automated way that addresses specific types of problems introduced by other implementations as described above. The techniques described herein also enable the ability to mix-and-match different artificial intelligence (AI) components based on use case and deployment circumstances, while still having the benefits of an automated real-time director's cut. The techniques describe herein may thus enhance user experience while watching live streamed events. In addition, the techniques enable automated panning and zooming of camera systems based on automatically determined views to be captured that may otherwise be manually operated with highly skilled operators. In various examples, the techniques described herein can accommodate a diversity of camera placements, room types, any number of AI components. For example, any number of the AI components described herein may be used to solve specific problems within an overall use case.

FIG. 1 is a block diagram illustrating an example system for generating real-time director's cuts using detected behavior. The example system 100 can be implemented via the computing device 900 in FIG. 9 using the method 800 of FIG. 8.

The example system 100 includes a number of cameras 102. For example, the each of the cameras 102 may be capturing video of one or more participants of an event. The system 100 includes a number of microphones 104. For example, each of the microphones 104 may be associated with a particular speaker. In some examples, the voices of each of the participants of an event may be individually recorded using separate microphones 104. The system 100 further includes a speaker-to-participant mapper 106 communicatively coupled to both the cameras 102 and the microphones 104. The system 100 further includes a participant extractor 108 communicatively coupled to the cameras 102. The system 100 also includes a speech-centric evaluator 110 communicatively coupled to the microphones 104. The system 100 further includes a speech pattern detector 112 communicatively coupled to the microphones 104. The system 100 includes a role-centric evaluator 114 communicatively coupled to the participant extractor 108, the speech-centric evaluator 110, and the speech pattern detector 112. The system 100 also includes a gaze-centric evaluator 116 communicatively coupled to the role-centric evaluator 114. The system 100 includes an emotion-centric evaluator 118 communicatively coupled to the gaze-centric evaluator 116. The participant extractor 108 is shown generating a number of view-of-participant streams 120. The speech-centric evaluator 110 and speech pattern detector 112 are shown generating predictive and timing metadata 122. The role-centric evaluator 114 is shown generating a first set of ranked views 124. The gaze-centric evaluator 116 is shown a second set of ranked views 126. The emotion-centric evaluator 118 is shown generating three possible outputs including an original decision 128A that may be a most engaged view or a highest ranked view, a split view 1288 including an original decision and a most emotional view, and view including just the most emotional view 128C. A first feedback loop 130 is indicated by an arrow from the predictive and timing metadata to the cameras 102. A second feedback loop 132 is indicated by an arrow from the gaze-centric evaluator 116 to the cameras 102. A third feedback loop 134 is indicated by an arrow from the participant extractor 108 to the cameras 102.

The system 100 includes one or more AI-based components designed to detect specific kinds of contextual clues for purposes of creating a real-time director's cut. For example, the AI-based components may be trained AI models that can analyze facial expressions, body language, audio cues, etc., and detect patterns and detect the next speaker even before the next speaker starts speaking. The trained AI models can also detect that a participant is demonstrating strong emotions and that the real-time director's cut may therefore be focused onto that participant.

In the example of FIG. 1, a set of videos of participants on a scene may be received from cameras 102. In various examples, one or more video streams may be present. Each of the videos from cameras 102 may be capturing a scene. For example, the scene may be a stage with participants including ones or more speakers. In some examples, each video stream may feature zero or more of the participants.

In various examples, the speaker-to-participant mapper 106 can map voices in the captured audio to participants in the captured videos. For example, the speaker-to-participant mapper 106 can generate disparate audio and video streams with tagged voices heard in the audio streams corresponding to participants that appear in the videos from cameras 102.

In various examples, the participant extractor 108 can take one or more video streams 102 and extract view-of-participant streams 120 from the video streams of cameras 102. For example, each of the Camera-N video streams from cameras 102 may have one or multiple people. In various examples, the participant extractor 108 may be configured to capture "good views" of participants. For example, the participant extractor 108 interprets "good" according to some programming or configuration. In various examples, the decision-making of the participant extractor 108 may be focused on image quality and number of participants. In these examples, a good view may mean that at least one participant is clearly visible. In some examples, the participant extractor 108 may be configured as biased towards single participants versus a configurable maximum number of participants. In addition, the participant extractor 108 may be biased towards views that are cropped and focused on the face versus cropped or focused to include a face and body, etc.

As one example, the participant extractor 108 can take the video streams 102 and produce view-of-participant streams 120 that are viable for broadcast. In such a scenario, the participant extractor 108 can use the original view of a video stream from a camera 102 to produce a view-of-participant stream 120, crop sections out of a video stream from the camera 102 and produce a new view-of-participant stream 120, or even combine multiple crops from multiple video streams of multiple cameras 102 to produce a single view-of-participant stream 120.

In some examples, the participant extractor 108 can instruct automated camera equipment to affect video streams from cameras 102 such that the participant extractor 108 receives views that are preferred by the specific configuration or programming of the participant extractor 108. In such examples, the participant extractor 108 can use the predictive and timing metadata 122 to optimize the instructions to the camera hardware, as indicated by the arrow 134.

Thus, video streams from cameras 102 may be raw views that may be captured without any consideration for whether it is good or viable for broadcast. Although a video stream from a camera 102 may have metadata identifying each participant, the video stream may not be viable for broadcast. In various example, a key feature of each view-of-participant stream 120 is that downstream components can assume it is minimally viable for broadcast because it has sufficient image quality and at least one participant is visible.

In various examples, each view-of-participant stream 120 may be a video stream of at least one participant. In some examples, the extracted view-of-participant streams 120 may each have only have one person. For example, a view-of-participant stream 120 may be a cropped view of the participant. In some examples, the participant extractor 108 can cause a camera to zoom or pan onto a particular participant to generate a view-of-participant stream 120. For example, a first camera with a wide-angle lens may generate a wide angle shot including multiple participants in the video stream 102, and a second camera with a telephoto lens may be instructed by the participant extractor 108 to capture a particular participant of the multiple participants. In various examples, the participant extractor 108 can extract view-of-participant streams focused on faces, entire bodies, or both. In some examples, the participant extractor 108 can also produce view-of-participant streams including multiple participants. For example, such views may be in the form of wide-angle shots. In some examples, a single participant may appear in multiple view-of-participant streams 120. For example, the participants may appear in multiple camera angles, crops, panned shots, etc. With multiple resulting viable view-of-participant streams 120 available for broadcast, the role-centric evaluator 114, gaze-centric evaluator 116, and the emotion-centric evaluator 118 can choose the best one or more view-of-participant streams 120 to broadcast.

In various examples, the speech-centric evaluator 110 and speech pattern detector 112 can provide predictive and timing metadata 122 including predictive time-based markers in the view-of-participant streams 120. For example, the predictive time-based markers may signal when an active speaking participant may change and which other participant might be the next active speaker. In various examples, the predictive and timing metadata 122 may be used in examples where a downstream logic has limited computing resources and cannot process every stream. For example, an artificial intelligence (AI) component or decision-making logic, such as the role-centric evaluator 114, the gaze-centric evaluator 116, or the emotion-centric evaluator 118, can identify and prioritize analysis of video streams 102 most likely involved in the hand-off of active speaking from one participant to a different participant. In some examples, the predictive and timing metadata 122 may be used in examples where a real-time broadcast has a time delay between camera-recording and actual broadcast. For example, the speech-centric evaluator 110 and speech pattern detector 112 may use broadcast delay by employing additional logic to correct mistakes in their predictions using an actual ground-truth that occurs at a later time-position in the stream. In some examples, in response to detecting that sufficient time exists prior to the window of opportunity provided by the delay, the role-centric evaluator 114, the gaze-centric evaluator 116, or the emotion-centric evaluator 118 can opt to redo or reconsider decisions made that used that faulty data. Moreover, the participant extractor 108 can issue new instructions to automated camera hardware. For example, the new instructions may cause the automated camera hardware to zoom or pan to a different view. In various examples, the predictive and timing metadata 122 may be used in determining whether to broadcast particular multiple view-of-participant streams 120. For example, the time-based markers may be used to assist in scheduling when to switch video streams that are composited and broadcast to the audience. In some examples, the predictive and timing metadata 122 may be used to assist in prioritizing which video streams the other AI components, including the role-centric evaluator 114, the gaze-centric evaluator 116, and the emotion-centric evaluator 118, should analyze. For example, the predictive and timing metadata 122 may be used to determine whether a highest ranked view-of-participant stream 124 detected by the role-centric evaluator 114 is to be broadcasted or may be used to determine the highest ranked view-of-participant stream 124 at the role-centric evaluator 114. In various examples, as indicated by feedback 130, the speech-centric evaluator 110 and speech pattern detector 112 can also cause one or more cameras to pan or zoom to prepare for the next view-of-participant to be broadcast.

In various examples, the role-centric evaluator 114 can receive a set of extracted view-of-participant streams and rank and tag each of the view-of-participant streams based on whether each participant is fulfilling their role correctly. In some examples, the role-centric evaluator 114 can detect a best behaved participant based on a set of desired behavioral parameters. For example, participants that are supposed to be speaking and are actually speaking may have the highest ranks. In some examples, participants speaking out of turn may have slightly lower ranks. In various examples, all remaining participants may have a lower rank. In some examples, as in cases where all participants are appropriately silent, the highest ranked view may be a view-of-participant stream including a shot, crop, or view including the most participants.

In various examples, the system 100 may broadcast the highest-ranking view-of-participant stream 120. For example, the system 100 may broadcast a highest-ranking view-of-participant stream in response to detecting that the highest ranking view-of-participant stream 120 is a wide-angle view with multiple participants. However, in some examples, a single participant may appear in multiple view-of-participant streams. Consequently, in such examples, the top-ranking view-of-participant streams may be occupied by a single participant.

In various examples, the gaze-centric evaluator 116 can assist in choosing a most audience-engaged view-of-participant stream of a participant from a set of view-of-participant streams of each participant. For example, where multiple viable view-of-participant streams are candidates for broadcasting to the audience, the gaze-centric evaluator 116 can annotate the rankings such that views where a participant is looking directly at the camera can be marked as "most engaged of this Participant". In cases where the view-of-participant is a wide-angle view with multiple participants, the gaze-centric evaluator 116 can increase the ranking of view-of-participant streams having more faces looking at the camera 120 or audience. For example, the audience may be an in-studio audience. In various examples, a prediction of the next speaker from the gaze-centric evaluator 116 may be used to provide other components priority scheduling for processing resources. For example, in response to the gaze-centric evaluator 116 predicting that participant 2 and participant 3 are the most likely candidates for an upcoming shot, then the speech-centric evaluator 110, the speech pattern detector 112, the role-centric evaluator 114, and the emotion-centric evaluator 118, can prioritize evaluations involving participant2 and participant3.

As indicated by feedback 132, the gaze-centric evaluator 116 can also cause one or more cameras to pan or zoom in anticipation of the next view-of-participant to be broadcast. In various examples, the gaze-centric evaluator 116 can cause the system 100 to broadcast a most engaged view-of-participant 126 of the highest ranked choices from the ranked views 124. In some examples, the gaze-centric evaluator 116 may instead determine that a highest ranked view-of-participant stream 124 detected by the role-centric evaluator 114 is to be broadcasted. However, in some examples, the emotion-centric evaluator 118 can determine that a different participant is to share or potentially take over the broadcast based on their behavior or facial expressions.

In various examples, the emotion-centric evaluator 118 can assist the system 100 to determine whether to share or change the view-of-participant stream to another view-of-participant stream based on the different participants' behaviors. For example, the emotion-centric evaluator 118 can determine whether a highly emotional view-of-participant stream should be presented with the highest-ranked view-of-participant stream or as a replacement of the highest-ranked view-of-participant stream. For example, the emotion-centric evaluator 118 can determine that the highest-ranked view-of-participant stream is to be replaced because the emotional-level detected in the highly emotional view-of-participant stream is dramatic enough to merit replacement. For example, the emotion-centric evaluator 118 can determine a highest ranked emotional behavior and switch to the corresponding view-of-participant stream. Thus, a participant may take attention away from another user by detected emotional behavior. For example, the view-of-participant of a most emotional participant may be broadcast instead of the previous speaker. In various examples, this most emotional participant option may be disabled. For example, the emotion-centric evaluator 118 can be configured to determine whether previous choices by the role-centric evaluator 114 or the gaze-centric evaluator 116 are to be shown or shared based on the detected emotion-levels of the participants. In some examples, the emotion-centric evaluator 118 can determine that previous choices by the role-centric evaluator 114 or the gaze-centric evaluator 116 are to be shown in response to detecting that none of the views are emotionally compelling enough to override a top recommended choice from the role-centric evaluator 114 or the gaze-centric evaluator 116.

In various examples, a generalized output of the real-time director's cut may be a decision to one of three states. A first state may include keeping an original choice 128A of either the role-centric evaluator 114 or the gaze-centric evaluator 116. For example, the emotion-centric evaluator 118 may determine that a highest ranked view-of-participant stream 124 may be selected to be shown. In some examples, the emotion-centric evaluator 118 may determine that a most engaged view-of-participant stream 126 of the highest ranked choices is to be displayed. A second state may include selecting multiple views 128B that should be shared. For example, the emotion-centric evaluator 118 may determine that a highest ranked view-of-participant stream 124, a most engaged view-of-participant stream 126. A third state may include discarding the original choice in favor of a highest-ranked emotionally-expressive participant 128C. In some examples, in response to detecting that multiple views are to be shared, additional compositing logic can be configured to generate side-by-side compositing or time-based interlacing for the final broadcast of the real-time director's cut. For example, the time-based interlacing may include a back-and-forth view-switching between view-of-participant streams.

Thus, given a scene, such as a room or a stage of participants, and given one or more cameras focused on participants including cameras, or 360-video cameras placed between participants, a set of AI components interpreting the scene may be combined to produce a real time director's cut of the scene in a quick manner that embodies directorial best practices. In various examples, the directorial best practices may include creating a view of the current speaker, generating a slow pan and wide-shot views when nobody is talking or during natural transitions, avoiding updating the view too often such that people watching find the updates jarring, avoiding providing views of spurious talk or irrelevant side-conversations, and generating focused views of relevant participants based on context and the current situation.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, microphones, views, speech patterns, ranked views, participants, metadata, etc.). For example, 360-video cameras may capture all participants, their locations, and gross body language gestures when the 360-video camera is installed in the middle of a table and the participants are seated around the 360-video camera. An attached circular microphone array can perform audio beam forming to detect who is speaking. However, in some examples, such an arrangement may not be possible, such as in a televised debate. In various examples, a staged area may have high-quality cameras aimed at each participant, with sufficient quality for detecting facial expressions. The installation of cameras at known or fixed locations may allow inference of where each participant is gazing. Each participant in this example may also have a microphone that can be used to sufficiently identify who is actively speaking at any point in time, in addition to capturing particular nuances of speech. In some examples, the role-centric evaluator 114 or the emotion-centric evaluator 118 may be excluded. For example, these components may not be included in some corporate conferencing scenarios. In addition, the AI components including the speech-centric evaluator 110, the speech pattern detector 112, the role-centric evaluator 114, the gaze-centric evaluator 116, and the emotion centric evaluator 118 may be implemented using various methods including Automatic Speech Recognition (ASR), Object or Face detection, Pose Estimation and Emotion recognition with Convolutional Neural Network (CNN) and Extreme learning machines (ELM), Long short term memory networks (LSTMs) for audio and video together, and gaze prediction using a Recurrent Neural Network (RN N), among other suitable techniques. For example, the speech-centric evaluator 110 may be implemented using ASR, a language model including tone of voice and timing, such as speed of speech and pauses. In some examples, the speech pattern detector 112 may be implemented based on a recent history of speaking order. For example, the speech pattern detector 112 may be implemented using a dense network taking a fixed-size history as input. In some examples, the speech pattern detector 112 may be implemented using a temporal convolution. In some examples, the speech pattern detector 112 may be implemented using any form of recurrent neural network (RNN), such as a long short-term memory (LSTM) network among other RNNs. In various examples, the role-centric evaluator 114 may be implemented based on a list of received roles for participants. For example, the role-centric evaluator 114 may be implemented using a neural network trained to imitate human judgment by having someone label recorded meetings for training of the neural network. In various examples, the neural network may be a dense network, a temporal convolution, or an RNN on input data such as pose data and speech history. Alternatively, in some examples, the role-centric evaluator 114 may be rules-based. For example, a participant may be assigned as the presenter and always have a high score. Meanwhile, other participants may start out with a high score, but lose points any time the other participants talk over the presenter. In some examples, the other participants may, lose more points if the presenter does not look at them when they talk or if the other participants are detected as not looking at the presenter. In various examples, the role-centric evaluator 114 may stop selecting the other participants to be included in the director's cut the other participants ignore the presenter too much. In some examples, the score of the other participants may gradually recover while the other participants behaving correctly. In various examples, the gaze-centric evaluator 116 may be implemented based on eye contact made by a current speaker. For example, the gaze-centric evaluator 116 may be implemented using a convolutional neural network (CNN) and face pose estimation techniques. In some examples, once the 3D positions, the gaze directions, and metadata on camera positions in the case of multiple cameras, are obtained, then a geometric problem that can be solved with a math formula may be used by the gaze-centric evaluator 116. In various examples, the emotion centric evaluator 118 may also be implemented based on face pose or body pose. In various examples, the emotion centric evaluator 118 may be implemented using face pose detection performed for the gaze-centric detector 116 as an input. For example, the emotion centric evaluator 118 may focus on change over time and therefore use pose history as input rather than a single frame. In some examples, the emotion centric evaluator 118 may be implemented similarly to as the speech pattern detector, including the use of a dense network, a temporal convolution, or a RNN. In various examples, the emotion centric evaluator 118 may also receive image data and processing the image data with a CNN, in case there are subtle details that convey emotion that may not be captured in the pose data from the gaze-centric detector 116. For example, body pose may also be a useful input for the emotion centric evaluator 118.

Figure 2:
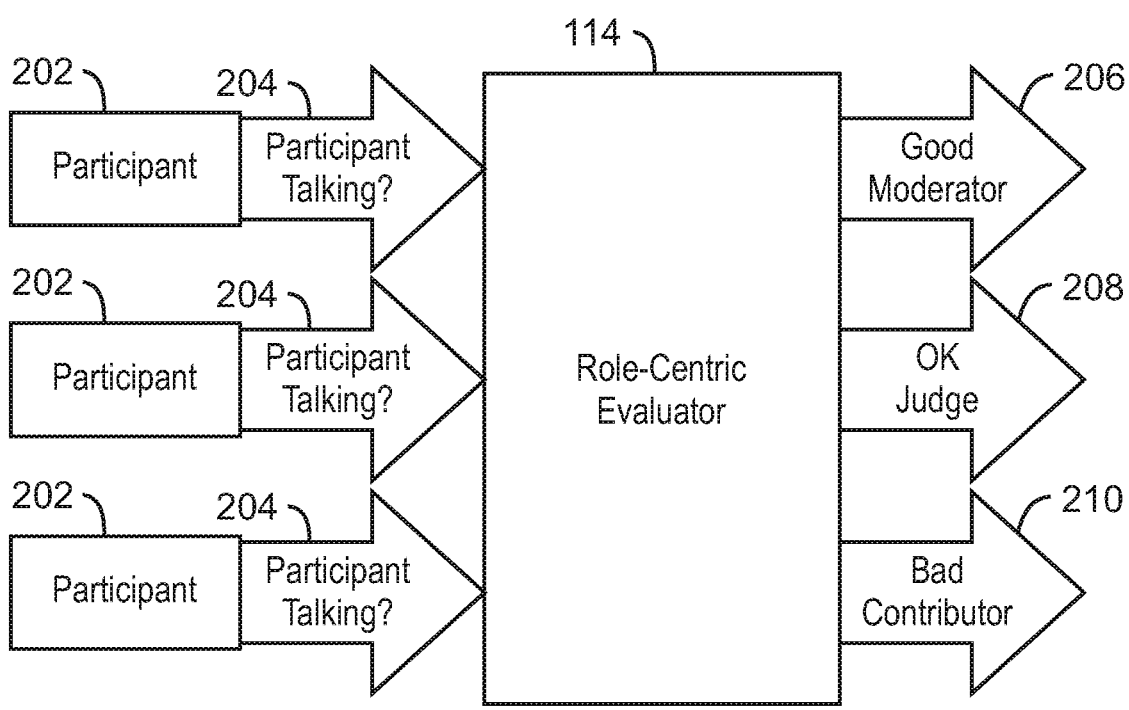
FIG. 2 is a block diagram illustrating an example role-centric evaluator for evaluating participants of a live-streamed event.

FIG. 2 is a block diagram illustrating an example role-centric evaluator for evaluating participants of a live-streamed event. The example role-centric evaluator 114 can be implemented in the system 100 using the computing device 900 of FIG. 9, or the computer readable media 1000 of FIG. 10.

In the example of FIG. 2, the role-centric evaluator 114 receives a number of views-of-participants 202, as well as speech detections 204 that may indicate whether each participant in a view-of-participant 202 is talking. For example, the speech detections may be received from a speech-centric evaluator (not shown) or a speech pattern detector (not shown). In various examples, an AI-based role-centric evaluator 114 may have been trained on understanding good behaviors for various roles of the participants and when to focus on camera on such participants. For example, role-centric evaluator 114 may have been trained such that participants identified as moderators are permitted to interrupt to bring order to the participants. In some examples, the role-centric evaluator 114 may cause a focusing of the camera on or a selection of a view-of-participant corresponding to moderators when they are fulfilling this moderation role as indicated by an arrow 206. As another example, participants identified as judges may reveal strong emotions in their facial expressions even though they are not talking. The role-centric evaluator 114 may thus cause a focusing of the camera onto judges even though they may not be talking, in response to detecting strong emotions, as indicated by an arrow 208. For example, the emotions may be detected by the emotion-centric evaluator 114.

In various examples, the role-centric evaluator 114 may determine that contributors are properly speaking in turn or improperly speaking out of turn. For example, a speaker may be speaking in turn when other speakers are not speaking or when formally recognized by a moderator or judge. The role-centric evaluator 114 may cause a camera to focus onto speakers in response to detecting that their turn is appropriate. Participants speaking out of turn may be detected to be bad contributors and ignored accordingly, as indicated by an arrow 210.

In some examples, the roles of the participants may be assigned by human intelligence. For example, a list of roles may be received for the participants. In addition, the input cameras and microphones may be deployed in such a way as to enable determination of when each participant is talking. Furthermore, during training of the role-centric evaluator 114, the training data may include ground truth data describing whether each participant was behaving correctly based on their role.

Figure 3:
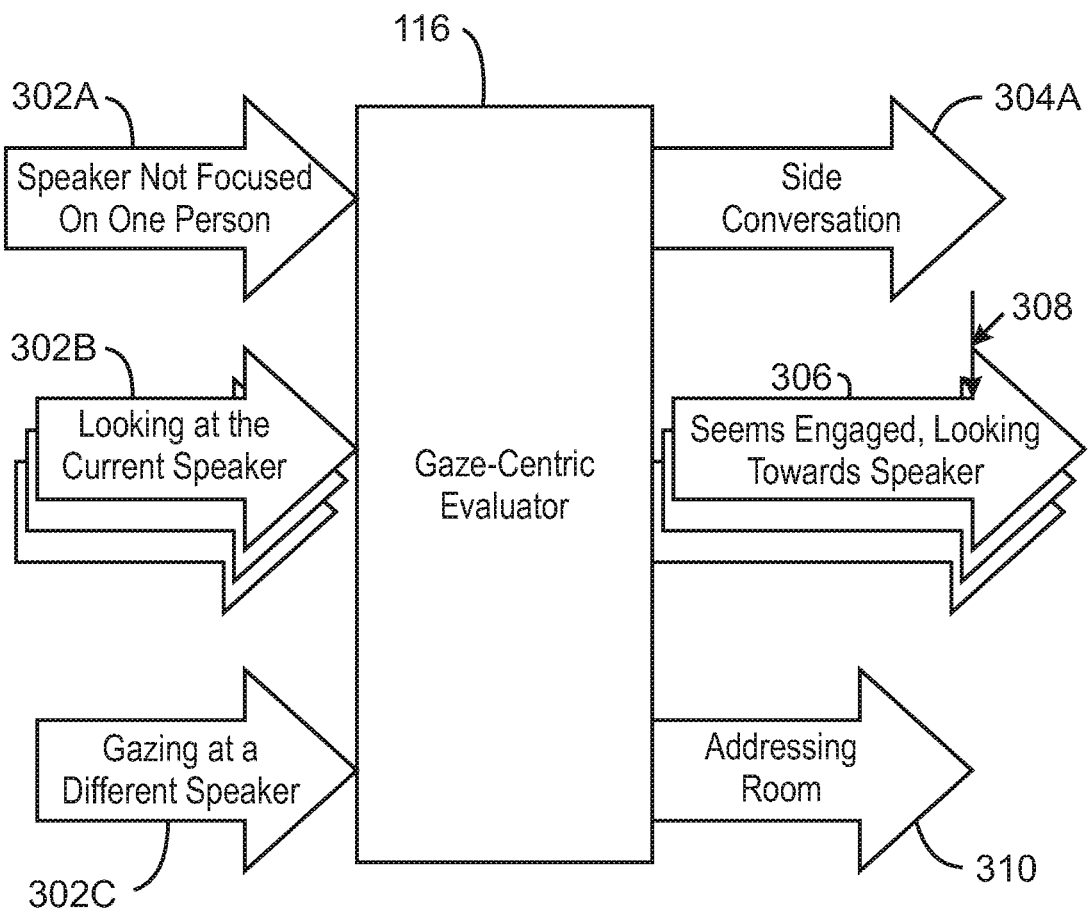
FIG. 3 is a block diagram illustrating an example gaze-centric evaluator for evaluating participants of a live-streamed event.

FIG. 3 is a block diagram illustrating an example gaze-centric evaluator for evaluating participants of a live-streamed event. The example gaze-centric evaluator 116 can be implemented in the system 100 using the computing device 900 of FIG. 9, or the computer readable media 1000 of FIG. 10.

In various examples, a number of video camera inputs of a room may be received to map or infer the direction of gazes of a number of participants. For example, a number of inputs from a number of forward field-of-view cameras may be used to determine the direction of gazes of the number of participants. In some examples, a 360-degree camera may be placed in between participants to map or infer the direction of gazes of the participants. In the example of FIG. 3, the gaze-centric evaluator 116 is shown receiving a first view 302A of a speaker not focused on any one person. The gaze-centric evaluator 116 is also shown receiving a number of views 302B of speakers looking at a current speaker. The gaze-centric evaluator 116 is further shown receiving a view 302C of a person gazing at a different speaker.

In various examples, the gaze-centric evaluator 116 may have been trained on predicting whether a person is likely to speak next based on a direction of their gaze. In some examples, the gaze-centric evaluator 116 may predict that a participant is about to speak next based on the participant's gaze on the current speaker. Based on this gazing context, the gaze-centric evaluator 116 can quickly switch a camera view to a different participant immediately when a current speaker finishes speaking and a different speaker begins speaking. In some examples, if a subsequent likely speaker is not predictable, then the gaze-centric evaluator 116 may use a recommended shot from the role-centric evaluator 114 or cause a wide-angle view to be displayed or a slow pan may be performed. For example, if no suitable highest ranking 124 is received from the role-centric evaluator 114, then the gaze-centric evaluator 116 may evaluate the highest rankings of 124 and find a wide-angle view or request a slow-pan, as indicated by arrow 132.

In various examples, the gaze-centric evaluator 116 may detect a side conversation 304 based on a participant engaging a different participant than the current speaker that is being displayed. In some examples, such side conversations 304, and any participants and audio corresponding thereto, may be ignored.

In some examples, the gaze-centric evaluator 116 may detect that a participant is engaged and looking towards a current speaker 304 in the number of views 302B of speakers looking at a current speaker. For example, the gaze-centric evaluator 116 may detect that a speaker is engaged with a particular participant in response to detecting the gaze of the speaker is on the participant. This detection may be used to predict that the particular participant is engaged with the current speaker and may attempt to speak next. Similarly, in some examples, the gaze-centric evaluator 116 can detect that a participant is engaged with a current speaker based on the gaze of the participant. The gaze-centric evaluator 116 can accordingly predict that the participant is about to speak at time 308 and switch the view to the participant before the participants begins to speak.

In some examples, the gaze-centric evaluator 116 can detect that a speaker is addressing a room 310. For example, the gaze-centric evaluator 116 can cause a view-of-participant 120 including the most participants to be displayed in response to detect that a speaker is addressing a room 310. For example, the gaze-centric evaluator 116 can cause a video stream 102 to be displayed. In some examples, the gaze-centric evaluator 116 can cause one of the cameras to zoom or pan before the video stream 102 is displayed. In these manners, the speech-centric evaluator 110 can automatically address directorial issues related to participants talking out of turn. Moreover, the speech-centric evaluator 110 can generally provide a basic mechanism for improving the timeliness of switching between views of speakers in live streamed events.

Figure 4:
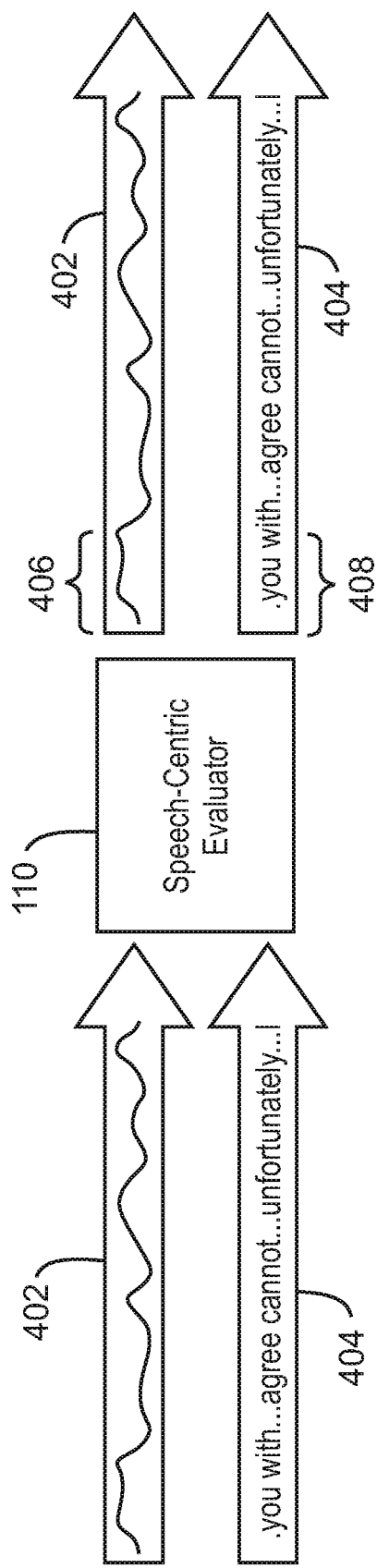
FIG. 4 is a block diagram illustrating an example speech-centric evaluator for evaluating participants of a live-streamed event.

FIG. 4 is a block diagram illustrating an example speech-centric evaluator for evaluating participants of a live-streamed event. The example speech-centric evaluator 110 can be implemented in the system 100 using the computing device 900 of FIG. 9, or the computer readable media 1000 of FIG. 10. In various examples, speech-centric evaluator 110 may be communicatively coupled to a number of microphone inputs associated with a number of participants.

In various examples, the speech-centric evaluator 110 may be an AI-based component trained to predict whether a participant is likely to stop talking based on how the participant is currently speaking. For example, the manner of speech intonation based on language and locality may be used by the speech-centric evaluator 110 as signals to predict when a speaker is about to finish speaking. In some languages, certain keywords or phrases may be used to indicate an imminent end of a sentence. In various examples, the speech-centric evaluator 110 can cause the view in a director's cut to quickly switch to a different participant immediately when the current speaker finishes talking and a different speaker starts talking based on these factors. In some examples, in response to detecting that a target participant to switch to is not available, then the speech-centric evaluator 110 may cause a default wide-angle host to be displayed from the video streams 102 or a slow pan of one of the video streams 102.

In the example of FIG. 4, the speech-centric evaluator 110 is shown receiving an audio signal 402 corresponding to speech 404. In various examples, the speech-centric evaluator 110 can detect that an intonation 406 in the audio signal 402 indicates a potential imminent end to a sentence. In some examples, the speech-centric evaluator 110 can detect that a particular combination of words 408 in the speech 404 are more likely to be at the end of a sentence and therefore indicate a potential imminent end to the sentence. Thus, the speech-centric evaluator 110 can predict an imminent end to a sentence and provide this information to another AI-based component to determine whether to switch views based on the imminent end of the sentence and one or more other factors. The speech-centric evaluator 110 may thus provide an additional mechanism for improving timeliness of switching between views in a real-time director's cut.

Figure 5:
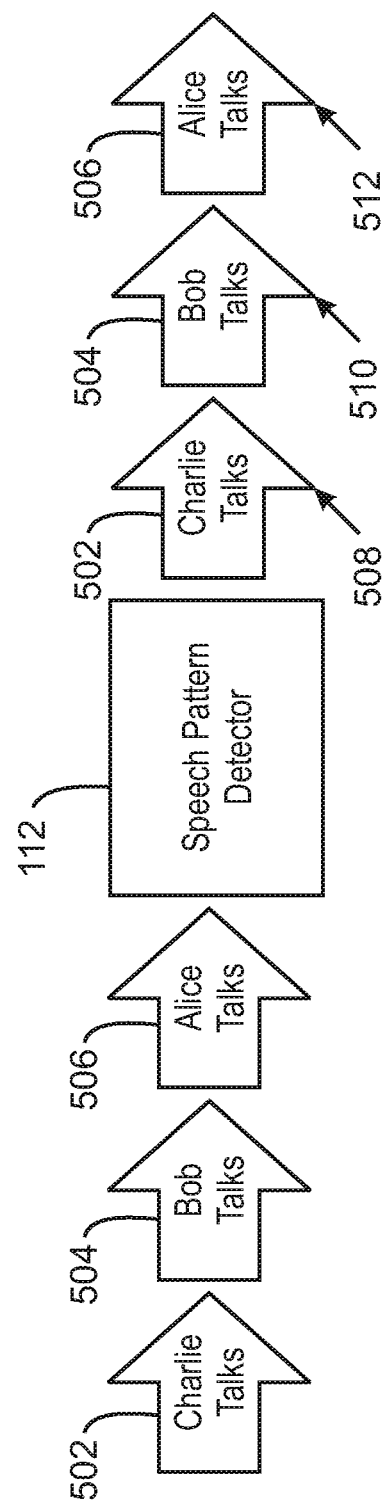
FIG. 5 is a block diagram illustrating an example speech pattern detector for evaluating participants of a live-streamed event.

FIG. 5 is a block diagram illustrating an example speech pattern detector for evaluating participants of a live-streamed event. The example speech pattern detector 112 can be implemented in the system 100 using the computing device 900 of FIG. 9, or the computer readable media 1000 of FIG. 10.

In various examples, the speech pattern detector 112 may be an AI-based component trained on predicting patterns of speaking order. The speech pattern detector 112 may receive camera and microphone inputs such that the speech pattern detector 112 can accurately detect participants' physical placement relative to each other and detect who is actively speaking. In the example of FIG. 5, the camera and microphone inputs may be associated with three speakers including Charlie 502, Bob 504, and Alice 506.

Referring to FIG. 5, in some examples, a particular pattern may be used for an event being recorded and broadcasted. For example, a broadcasted meeting room or a televised debate may enter into a round-robin pattern of speaking. In various examples, the speech pattern detector 112 can predict and prepare the next cut of a real time director's cut sequence to be a participant that is next in order of the detected pattern. For example, the next participant may be predicted based on a received participant ordering and preceding video sequences in the real-time director's cut. As one example, the meeting or televised debate may result in a back-and-forth speaking pattern, in which two participants spend an extended amount of time speaking with each other. The speech pattern detector 112 can detect this pattern and predict and prepare the next cut in the real-time director's cut to speak after a current speaker to be the previous speaker in the back-and-forth pattern. In some examples, such as some televised debate formats, the order in which facilitators, debaters, or judges speak may be highly structured. Therefore, the speech pattern detector 112 can predict who the next speaker will be based in part on their role. In this manner, the speech pattern detector 112 can enable a real-time director's cut to quick switch a camera view to a different participant immediately when a current speaker finishes speaking or when a subsequent different participant begins to speak.

In the example of FIG. 5, the speech pattern detector 112 can detect at time 508 that Charlie 502 is speaking and that a pattern of speech up to the point of Charlie 502 speaking appears to be in a round-robin pattern. The speech pattern detector 112 can accordingly predict that Bob is about to speak next. Once Charlie 502 stops talking, the shot may be switched to Bob 504 to capture Bob speaking. At time 510, the speech pattern detector 112 can detect that either Alice 506 or Charlie 502 may be speaking next. In some examples, the speech pattern detector 112 can cause the real-time director's cut to switch to Alice 506 in response to detecting Alice 506 speaking. In various examples, other cues may be used to detect that Alice 512 is the next speaker. For example, the speech pattern detector 112 can send predictive data to the gaze-centric evaluator 116 (not shown), which may detect that Bob 504 gazed at Alice 512 while speaking and that therefore Alice 512 is more likely than Charlie 502 to speak next. The gaze-centric evaluator 116 may then cause the real-time director's cut to switch to Alice 512 after Bob 504 is finished and before Alice 512 begins speaking. The speech pattern detector 112 may thus provide an additional mechanism for improving timeliness of switching between views in a real-time director's cut.

Figure 6:
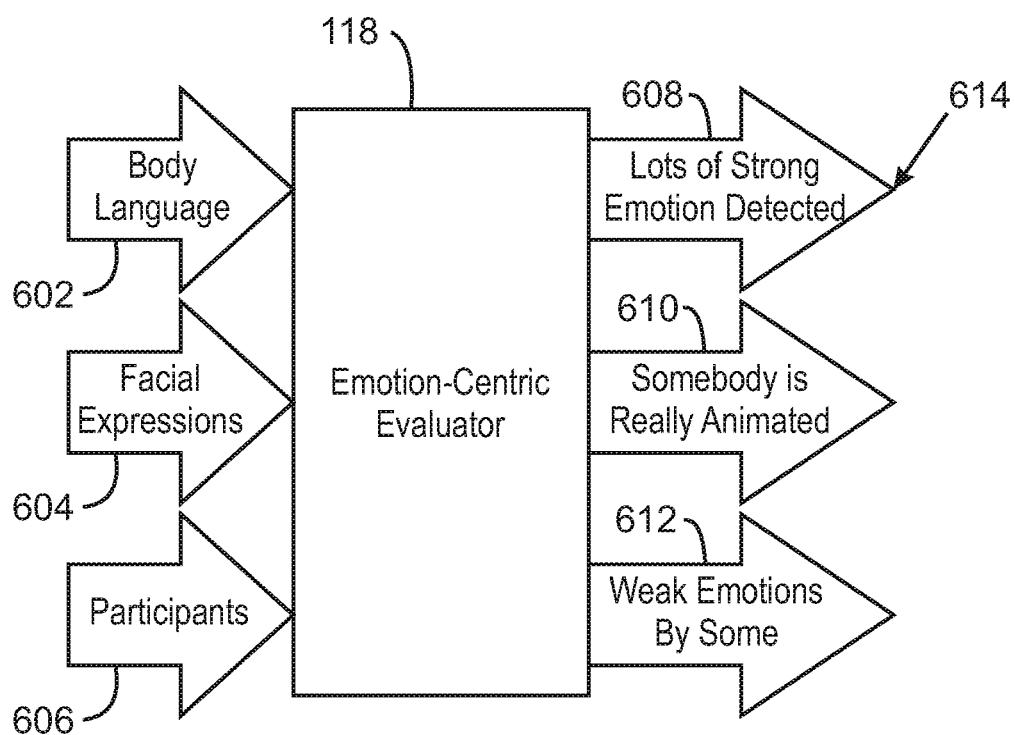
FIG. 6 is a block diagram illustrating an example speech-centric evaluator for evaluating participants of a live-streamed event.

FIG. 6 is a block diagram illustrating an example emotion-centric evaluator for evaluating participants of a live-streamed event. The example emotion-centric evaluator 118 can be implemented in the system 100 using the computing device 900 of FIG. 9, or the computer readable media 1000 of FIG. 10.

In various examples, the emotion-centric evaluator 118 may be an AI-based component trained on detecting strong positive or negative emotions based on facial expressions and other behaviors. For example, the facial expressions may include scowls and smiles. In various examples, other behaviors may include arms or hands moving, such as arm or hand movements above shoulder level. The emotion-centric evaluator 118 may receive camera inputs such that the emotion-centric evaluator 118 can capture facial features with sufficient quality for detecting strong facial expressions. In some examples, the camera inputs may also include views that include limb gestures such as movement of arms that may be associated with positive or negative emotions. In the example of FIG. 5, the camera inputs may be focused on body language 602, facial expressions 604, and the participants 606.

In some examples, the emotions detected for each participant may be normalized based on an emotional magnitude or intensity relative to the room or stage. For example, a smile may be normalized to have more intensity in response to detecting that no one else is smiling in the room, or less intensity in response to detecting that everyone else is smiling in the room. In various examples, participants with particular importance or a recent speaker may be given at least a brief period of camera time in response to detecting that they exhibit emotional intensity. In some examples, in response to detecting that many participants exhibit strong emotions, then the emotion-centric evaluator 118 can cause wide-angle shots and slow-pans to be used across the faces of the participants to provide views of all the faces of the participants. In various examples, although active speakers may generally receive the most camera time, the emotion-centric evaluator 118 may be used to provide non-speaking participants some camera time. For example, the emotional reactions of non-speaking participants may provide contextual information to an audience with respect to the content of the speech.

Referring to the example of FIG. 6, therefore, the emotion-centric evaluator 118 can detect lots of strong emotion 608 for a particular participant and execute a particular action. For example, the emotion-centric evaluator 118 can generate a composite view include the speaker along with a view of the other participant exhibiting the strong emotion 608 at time 614. In some examples, the emotion-centric evaluator 118 can generate a composite of the speaker and a panned view of the room. In various examples, the emotion-centric evaluator 118 can detect that a participant is really animated 610. For example, the participant may be shaking their arms or head, or exhibiting very strong facial cues. In some examples, the emotion-centric evaluator 118 can generate a focused view of the animated participant. In other examples, the emotion-centric evaluator 118 may detect weak emotions and not take any actions. For example, a currently speaking speaker may be allowed to continue receiving camera time.

Figure 7:
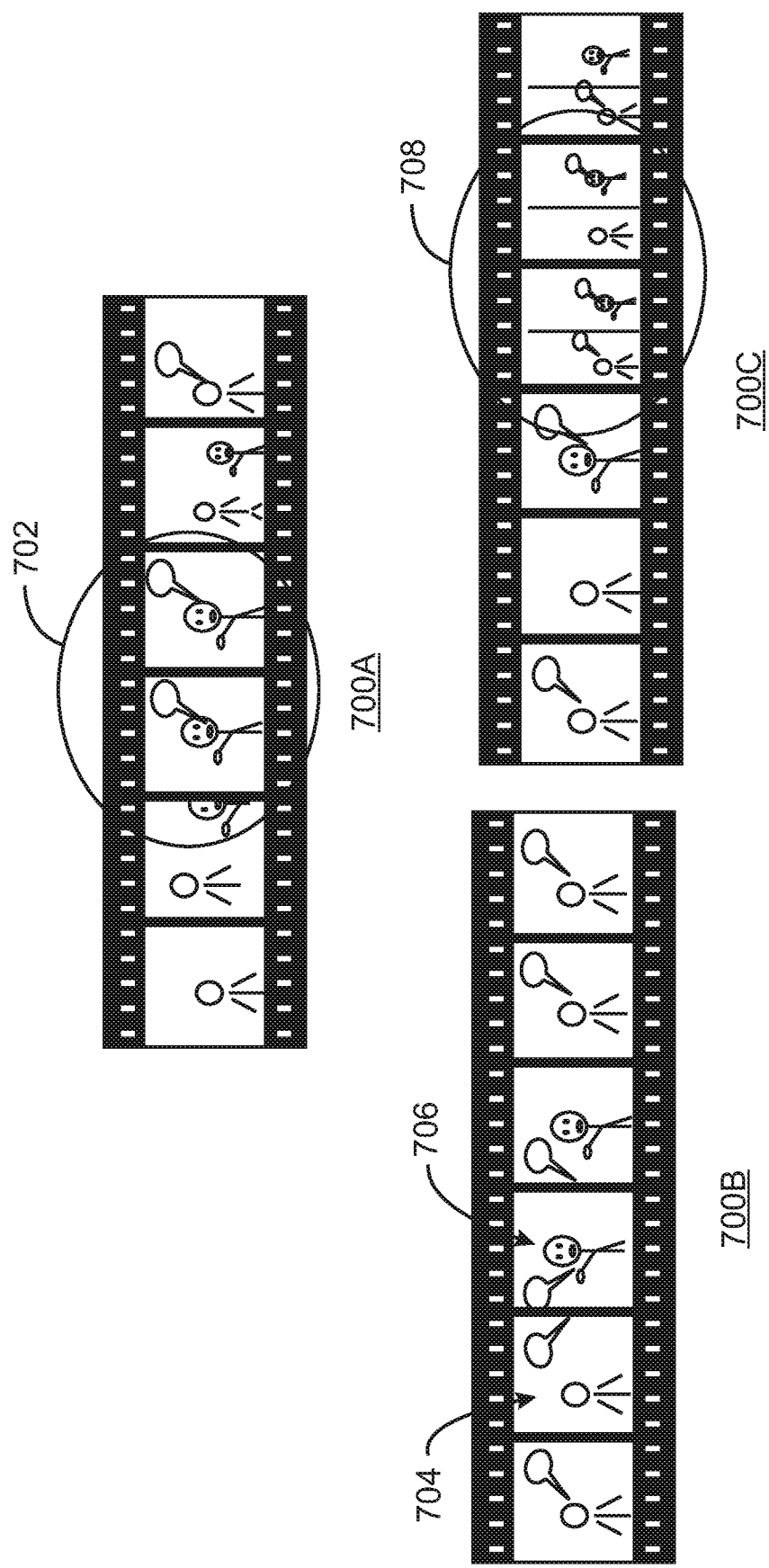
FIG. 7 is a diagram illustrating an example set of story boards corresponding to clips of real-time video that can be generated using the techniques described herein.

FIG. 7 is a diagram illustrating an example set of story boards corresponding to clips of real-time video that can be generated using the techniques described herein. For example, the clips 700A, 700B, and 700C can be generated using the method 800 of FIG. 8 via computing device 900 of FIG. 9, or the computer readable media 1000 of FIG. 10.

A first clip 700A shows a first person in a first frame. For example, the first person may have been speaking earlier, but is not currently speaking. The second frame is a zoomed out shot includes the first person along with a second person that is about to speak. A third frame is a shot that shows just the second person speaking. For example, the camera may have panned from the first person to the second person. The fourth frame includes a zoomed in shot of the second person speaking. A fifth frame shows a zoomed out shot of the first and second person. A sixth frame is a zoomed in shot that shows the first person speaking.

In various examples, with respect to clip 700A, a role-centric evaluator may have detected that the second person is a moderator or another important speaker and thus enabled the switch the view to the second person form the first person beginning in the second frame. However, in some examples, the role-centric evaluator may determine that the second speaker is speaking out of turn, and the shot may stay similar to the first frame until the first speaker begins speaking at the sixth frame.

A second clip 700B shows a first person speaking in a first frame. A second frame shows the first speaker no longer speaking along with a speech bubble indicating that someone else is speaking outside of view. A third frame shows a second person that was speaking in the second frame. A fourth frame shows the second speaker has stopped speaking and the first speaker is again speaking off of the view. The fifth and sixth frames show the first speaker speaking again.

In various examples, with respect to clip 700B, a role-centric evaluator may have detected that the first speaker has stopped speaking and automatically change the view in the second frame to include the second person before the second person begins speaking in the third frame. For example, the second frame may be a close up shot of the second person as in the third frame or a wider angle shot of both the first person and the second person. Thus, the view may be automatically changed without another two to five seconds of the second person talking to justify switching the camera view.

A third clip 700C shows a first person speaking in a first frame. In a second frame, the first person is shown stopped speaking. A third frame shows a second person speaking. A fourth frame shows a split view of the first person and second person both speaking. A fifth frame shows a split frame of the first person not speaking while the second person is speaking. A sixth frame shows a split view of the first person speaking while the second person is not speaking.

In various examples, with respect to clip 700C, various AI elements may be used to determine to keep both of the people in view beyond the consideration that both people were recently speaking. For example, an emotion-centric evaluator may determine that facial expressions of a non-speaker are worth capturing. In some examples, emotion-centric evaluator may detect strong emotions in multiple other participants to justify panning across the faces of multiple participants.

Figure 8:
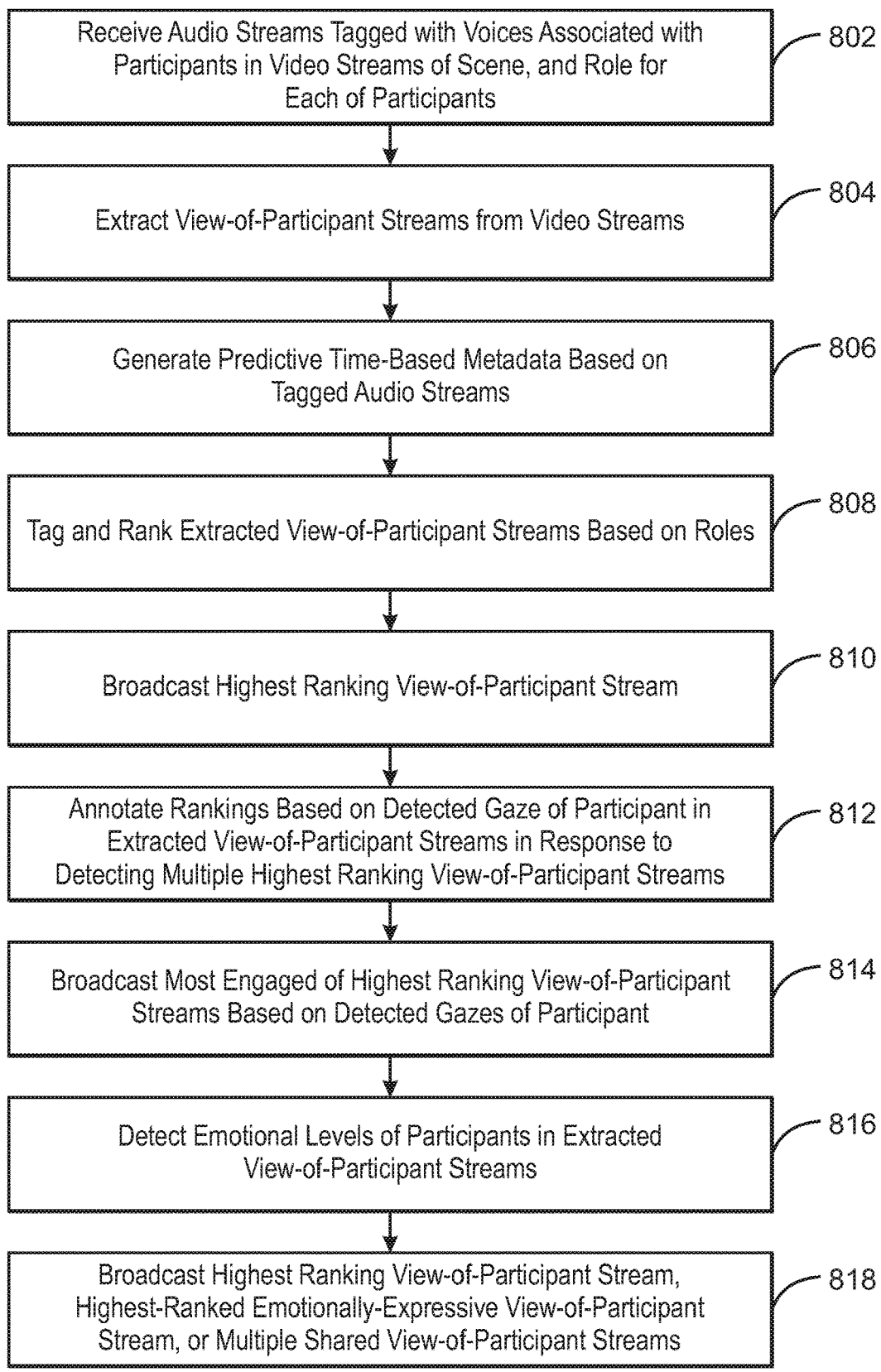
FIG. 8 is a process flow diagram illustrating a method for generating real-time director's cuts using detected behavior.

FIG. 8 is a process flow diagram illustrating a method for generating real-time director's cuts using metadata. The example method 800 can be implemented in the system 100 of FIG. 1, the computing device 900 of FIG. 9, or the computer readable media 1000 of FIG. 10.

At block 802, audio streams tagged with voices associated with participants in a number of video streams of a scene, and a role for each of the participants, are received. For example, the role may be a moderator, a judge, a contestant, a meeting facilitator, a meeting participant, a debater, a keynote speaker, a master of ceremonies (MC), a host, or a panelist, among other roles.

At block 804, view-of-participant streams are extracted from the number of streams. For example, the view-of-participant streams may be focused on faces of participants, the bodies of the participants, or both.

At block 806, predictive time-based metadata based on the tagged audio streams is generated. For example, a time to switch to a subsequent view-of-participant stream may be predicted based on intonation or a combination of words of the participant in the highest ranking view-of-participant stream. In some examples, a time to switch to a subsequent view-of-participant stream may be predicted based on speech of the participants or on a detected speech pattern between the participants.

At block 808, the extracted view-of-participant streams are tagged and ranked based on the roles for the participants. In some examples, analysis of the view-of-participant streams may also be prioritized based on speech of the participants or on detected speech patterns between the participants. As one example, each view-of-participant may include two types of metadata. The first metadata may include a role of the participant. For example, human intelligence may have assigned a mapping between each participant and an associated role. The second metadata may include an evaluation of the behavior of the participant. For example, the evaluation may indicate whether a participant exhibits good role behavior or not. In various examples, the behavior evaluation may be based on three determinations. For example, a first determination may be whether the participant talking right now. In some examples, the answer for the first determination may generally be an unambiguous yes or no. A second determination may be that, given that the participant is talking, should the participant be talking given their role? A third determination may be, that given that a participant is not talking, is the participant supposed to be quiet? In some examples, the answer for the second determination and the third determination may also be a yes or a no. However, in some examples, the answer for the second determination and the third determination may also be a value of maybe, where maybe represents a continuum between values of yes and no with one or more values. For example, in a meeting where lots of people are talking over each other, there may be an implied hierarchy for who should be talking. In some examples, the hierarchy may be used to generate the continuum of values. However, in various examples, the implied hierarchy may also be reduced to a yes or a no determination. For example, with regards to the second determination at a particular point in time, yes may be the value provided for the participant highest in the hierarchy and everybody else may be provided a value of no. In various examples, a set of ranking rules may be provided. For example, given a goal of not awarding camera time to people who are constantly interrupting, the following ranking order may be used: should be talking and is talking, should be quiet and is quiet, should be talking and is quiet, should be quiet and is talking.

At block 810, a highest ranking view-of participant stream is broadcasted. For example, the highest ranking view-of participant stream may replace a previously broadcasted stream.

At block 812, rankings are annotated based on a detected gaze of a participant in the extracted views in response to detecting multiple highest ranking views of participant streams. For example, each of the rankings may be annotated with metadata indicating a level of engagement for the participants based on the detected gaze.

At block 814, a most engaged highest ranking view-of-participant stream is broadcasted based on the detected gaze of the participant. For example, a most audience-engaged view-of-participant stream may be detected from a set of view-of-participant streams of a participant based on a detected gaze of the participant in the set of view-of-participant streams.

At block 816, emotional levels of participants in the extracted view-of-participant streams are detected. For example, a normalized emotional response in one of the participants that exceeds a threshold emotional level may be detected for a participant.

At block 818, a highest ranking view-of-participant stream, a highest-ranked emotionally-expressive view-of-participant stream, or multiple shared view-of-participant streams is broadcasted. For example, the multiple shared view-of-participant streams may be broadcasted in a split screen format. In some examples, a view-of-participant corresponding to the emotional participant may be displayed in addition to or in place of the highest ranking view-of-participant stream.

This process flow diagram is not intended to indicate that the blocks of the example method 800 are to be executed in any particular order, or that all of the blocks are to be included in every case. Further, any number of additional blocks not shown may be included within the example method 800, depending on the details of the specific implementation.

Figure 9:
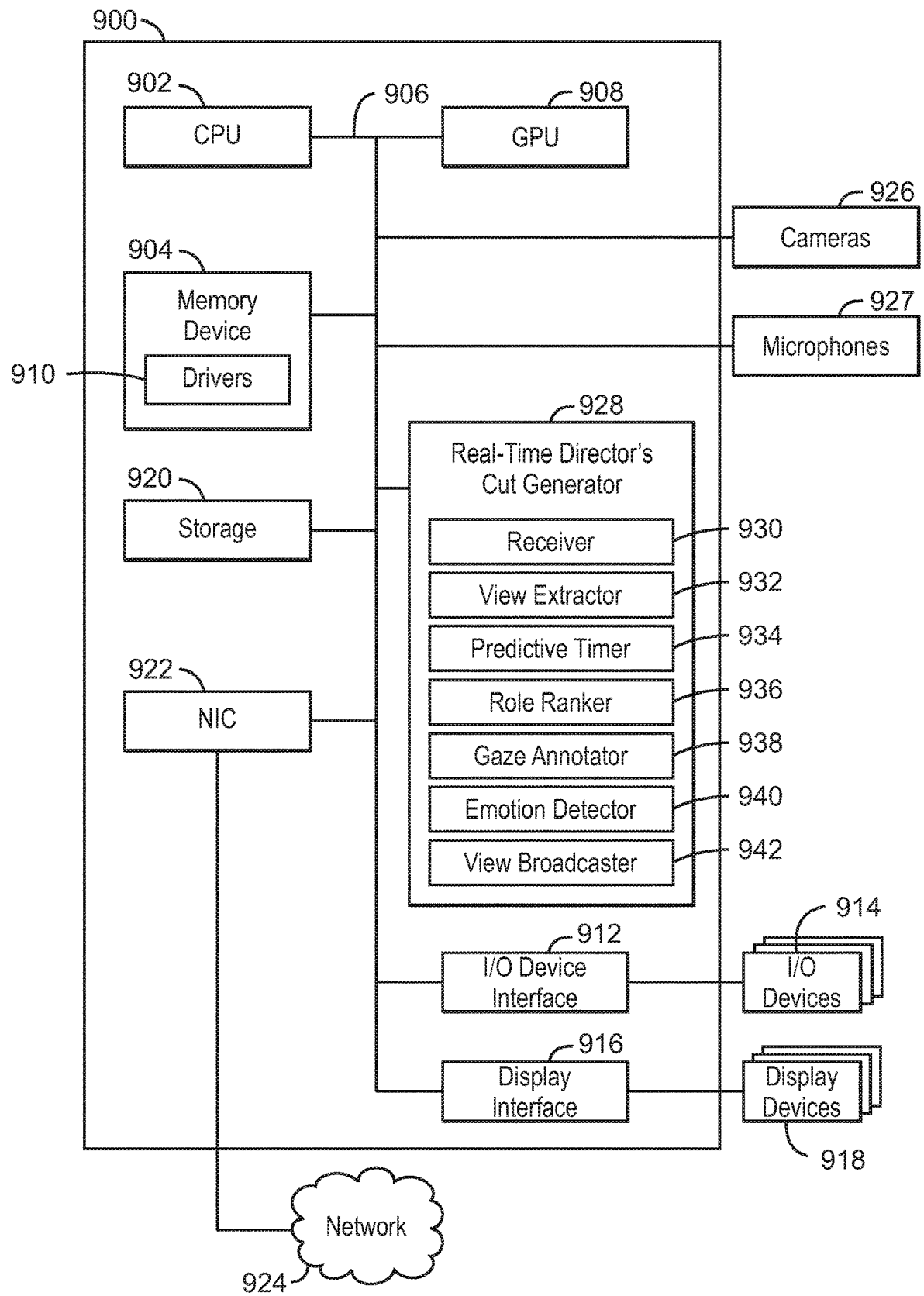
FIG. 9 is block diagram illustrating an example computing device that can generate real-time director's cuts using detected behavior.

Referring now to FIG. 9, a block diagram is shown illustrating an example computing device that can generate real-time director's cuts using metadata. The computing device 900 may be, for example, a laptop computer, desktop computer, tablet computer, mobile device, or wearable device, among others. In some examples, the computing device 900 may be part of a conferencing system or a film-recording studio where the cameras operate in tandem with the computing device 900. The computing device 900 may include a central processing unit (CPU) 902 that is configured to execute stored instructions, as well as a memory device 904 that stores instructions that are executable by the CPU 902. The CPU 902 may be coupled to the memory device 904 by a bus 906. Additionally, the CPU 902 can be a single core processor, a multi-core processor, a computing cluster, or any number of other configurations. Furthermore, the computing device 900 may include more than one CPU 902. In some examples, the CPU 902 may be a system-on-chip (SoC) with a multi-core processor architecture. In some examples, the CPU 902 can be a specialized digital signal processor (DSP) used for image processing. The memory device 904 can include random access memory (RAM), read only memory (ROM), flash memory, or any other suitable memory systems. For example, the memory device 904 may include dynamic random access memory (DRAM).

The memory device 904 can include random access memory (RAM), read only memory (ROM), flash memory, or any other suitable memory systems. For example, the memory device 904 may include dynamic random access memory (DRAM).

The computing device 900 may also include a graphics processing unit (GPU) 908. As shown, the CPU 902 may be coupled through the bus 906 to the GPU 908. The GPU 908 may be configured to perform any number of graphics operations within the computing device 900. For example, the GPU 908 may be configured to render or manipulate graphics images, graphics frames, videos, or the like, to be displayed to a user of the computing device 900.

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for training multiple convolutional neural networks to perform sequence independent processing. The device drivers 910 may be software, an application program, application code, or the like.

The CPU 902 may also be connected through the bus 906 to an input/output (I/O) device interface 912 configured to connect the computing device 900 to one or more I/O devices 914. The I/O devices 914 may include, for example, a keyboard and a pointing device, wherein the pointing device may include a touchpad or a touchscreen, among others. The I/O devices 914 may be built-in components of the computing device 900, or may be devices that are externally connected to the computing device 900. In some examples, the memory 904 may be communicatively coupled to I/O devices 914 through direct memory access (DMA).

The CPU 902 may also be linked through the bus 906 to a display interface 916 configured to connect the computing device 900 to a display device 918. The display device 918 may include a display screen that is a built-in component of the computing device 900. The display device 918 may also include a computer monitor, television, or projector, among others, that is internal to or externally connected to the computing device 900.

The computing device 900 also includes a storage device 920. The storage device 920 is a physical memory such as a hard drive, an optical drive, a thumbdrive, an array of drives, a solid-state drive, or any combinations thereof. The storage device 920 may also include remote storage drives.

The computing device 900 may also include a network interface controller (NIC) 922. The NIC 922 may be configured to connect the computing device 900 through the bus 906 to a network 924. The network 924 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 900 is further coupled to cameras 926. For example, the cameras 926 may be coupled to the computing device 900 via any suitable camera or digital interface (not shown). In various examples, the cameras 926 may each include one or more imaging sensors. In some examples, the cameras 926 may include a processor to generate video frames. In various examples, the cameras 926 can include wide-angle, standard, telephoto, or zoom lenses.

The computing device 900 is also coupled to microphones 927. For example, the microphones 927 may be coupled to the computing device 900 via any suitable audio or digital interface (not shown). In various examples, each of the microphones 927 may be associated with a particular participant. For example, each participant may be wearing a microphone 927 or be standing or sitting in front of a microphone 927. In some examples, the microphones 927 may be a microphone array. For example, the microphone array may be implemented using beamforming for detecting a spatial source of audio.

The computing device 900 further includes a real-time director's cut generator 928. For example, the real-time director's cut generator 928 can be used to generate real-time director's cuts for live streamed events. The real-time director's cut generator 928 can include a receiver 930, view extractor 932, a predictive timer 934, a role ranker 936, a gaze annotator 938, an emotion detector 940, and a view broadcaster 942. In some examples, each of the components 930-942 of the real-time director's cut generator 928 may be a microcontroller, embedded processor, or software module. The receiver 930 can receive views-of-participants and a role for each of the participants and rank the views-of-participants based on the roles. Each of the views-of-participants are tagged with one of the participants. In various examples, the voices in the captured audio are tagged with participants that appear in the captured videos. The view extractor 932 can extract the views-of-participants from the captured videos. The views-of-participants are focused on faces of the participants, bodies of the participants, or both. The predictive timer 934 can include a speech-centric evaluator to detect an imminent end to a sentence based on intonation or a combination of words. The view broadcaster is to switch to another view-of-participant stream that is determined or prepared after the detection and before the end of the sentence. The predictive timer 934 can include a speech pattern detector to detect a speech pattern between the participants and predict an upcoming speaker based on the detected speech pattern. The role ranker 936 can rank the extracted view-of-participant streams based on the roles for the participants. For example, a first participant detected as behaving within the role for the first participant is ranked higher than a second participant that is not behaving within the role for the second participant. The gaze annotator 938 can detect a gaze for a participant in an associated view-of-participant and predict a speaker to follow a current speaker based on the detected gaze of the participant. For example, the prediction may be used to provide time for switching over, and performing any action necessary to get the next shot, such as panning or zooming a lens, etc. In various examples, the prediction may be used to provide other components priority scheduling for processing resources. In some examples, the gaze annotator 938 can detect a gaze for a participant in an associated view-of-participant. For example, a most audience-engaged view-of-participant stream can be detected from a set of view-of-participant streams of that participant based on the detected gaze. The emotion detector 940 can detect a normalized emotional response in an emotional participant that exceeds a threshold emotional level. The view broadcaster is to display a view-of-participant corresponding to the emotional participant in addition to or in place of the highest ranking view-of-participant stream. The view broadcaster 942 can broadcast a highest ranking view-of-participant stream. In some examples, the view broadcaster 942 can broadcast a highest-ranked emotionally-expressive view-of-participant stream.

The block diagram of FIG. 9 is not intended to indicate that the computing device 900 is to include all of the components shown in FIG. 9. Rather, the computing device 900 can include fewer or additional components not illustrated in FIG. 9, such as additional buffers, additional processors, and the like. The computing device 900 may include any number of additional components not shown in FIG. 9, depending on the details of the specific implementation. For example, the computing device 900 can include a speaker-to-participant mapper to map voices in the captured audio to participants in the captured videos. In some examples, the computing device 900 can include a participant extractor to extract the views-of-participants from the captured videos. For example, the views-of-participants are focused on faces of the participants, bodies of the participants, or both. Furthermore, any of the functionalities of the receiver 930, the view extractor 932, the predictive timer 934, the role ranker 936, the gaze annotator 938, the emotion detector 940, and the view broadcaster 942, may be partially, or entirely, implemented in hardware and/or in the processor 902. For example, the functionality may be implemented with an application specific integrated circuit, in logic implemented in the processor 902, or in any other device. In addition, any of the functionalities of the CPU 902 may be partially, or entirely, implemented in hardware and/or in a processor. For example, the functionality of the real-time director's cut generator 928 may be implemented with an application specific integrated circuit, in logic implemented in a processor, in logic implemented in a specialized graphics processing unit such as the GPU 908, or in any other device.

Figure 10:
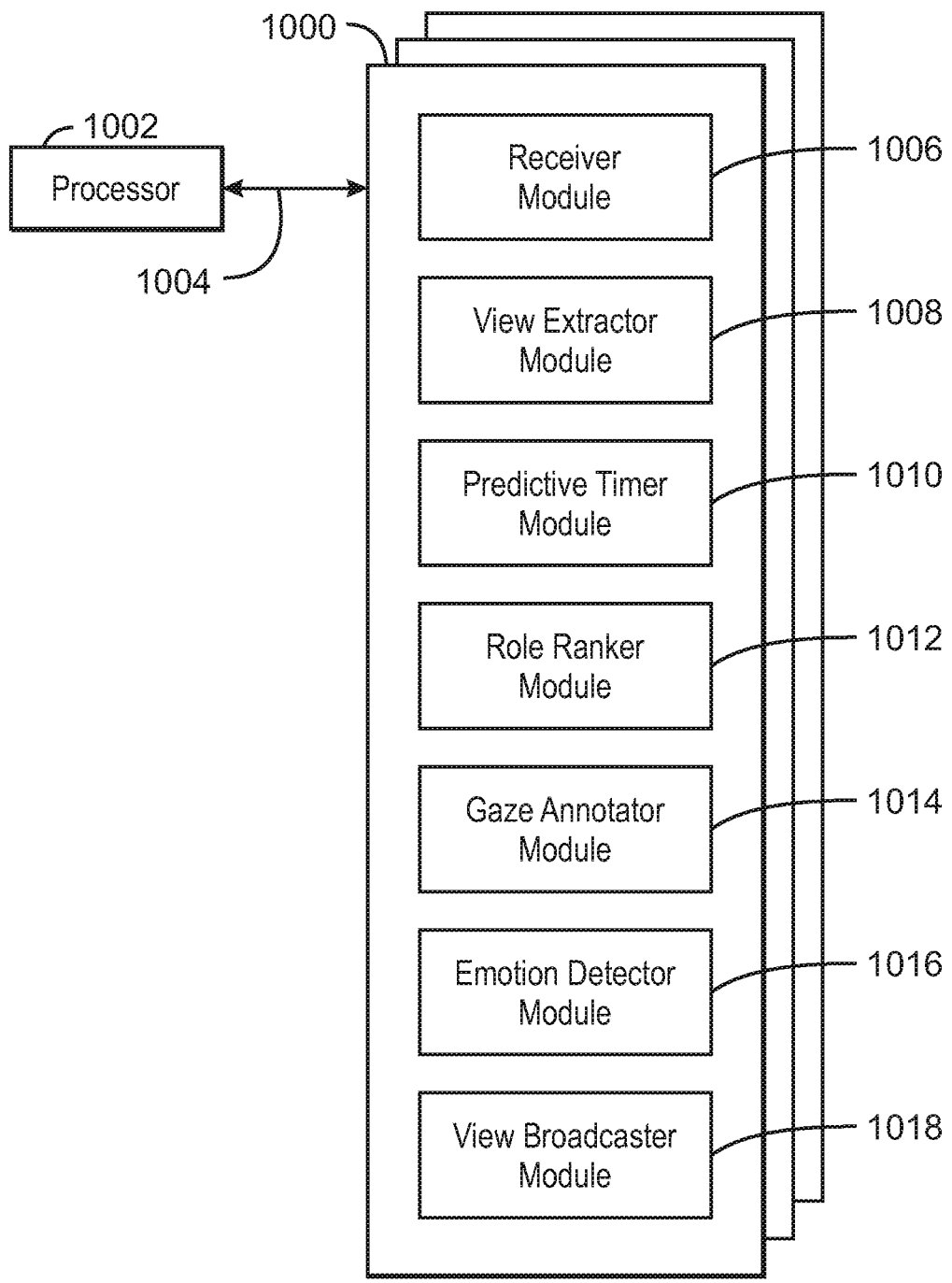
FIG. 10 is a block diagram showing computer readable media that store code for generating real-time director's cuts using detected behavior.

FIG. 10 is a block diagram showing computer readable media 1000 that store code for generating real-time director's cuts using metadata. The computer readable media 1000 may be accessed by a processor 1002 over a computer bus 1004. Furthermore, the computer readable medium 1000 may include code configured to direct the processor 1002 to perform the methods described herein. In some embodiments, the computer readable media 1000 may be non-transitory computer readable media. In some examples, the computer readable media 1000 may be storage media.

The various software components discussed herein may be stored on one or more computer readable media 1000, as indicated in FIG. 10. For example, a receiver module 1006 may be configured to receive audio streams tagged with voices associated with participants in a number of video streams of a scene, and a role for each of the participants. A view extractor module 1008 may be configured to extract view-of-participant streams from the number of streams. A predictive timer module 1010 may be configured to generate predictive time-based metadata based on the tagged audio streams. In some examples, the predictive timer module 1010 may be configured to predict a time to switch to a subsequent view-of-participant stream based on intonation or a combination of words of the participant in the highest ranking view-of-participant stream. In various examples, the predictive timer module 1010 may be configured to predict a time to switch to a subsequent view-of-participant stream based on speech of the participants or on a detected speech pattern between the participants. A role ranker module 1012 may be configured to tag and rank the extracted view-of-participant streams based on the roles for the participants. A gaze annotator module 1014 may be configured to annotate rankings based on detected gaze of a participant in the extracted views in response to detecting multiple highest ranking views of participant streams. In some examples, the gaze annotator module 1014 may be configured to detect a most audience-engaged view-of-participant stream from a set of view-of-participant streams of a participant based on a detected gaze of the participant in the set of view-of-participant streams. An emotion detector module 1016 may be configured to detect emotional levels of participants in the extracted view-of-participant streams. In some examples, the emotion detector module 1016 may be configured to detect a normalized emotional response in one of the participants that exceeds a threshold emotional level and displaying a view-of-participant corresponding to the emotional participant in addition to or in place of the highest ranking view-of-participant stream. A view broadcaster module 1018 may be configured to broadcast a highest ranking view-of-participant stream. In some examples, the view broadcaster module 1018 may be configured to broadcast a highest-ranked emotionally-expressive view-of-participant stream.

The block diagram of FIG. 10 is not intended to indicate that the computer readable media 1000 is to include all of the components shown in FIG. 10. Further, the computer readable media 1000 may include any number of additional components not shown in FIG. 10, depending on the details of the specific implementation. In various examples, the role ranker module 1012, the gaze annotator module 1014, and the emotion detector module 1016 may be configured to prioritize the analysis of the view-of-participant streams based on speech of the participants or on detected speech patterns between the participants. In some examples, each of the gaze annotator module 1014 and the emotion detector module 1016 may defer to decisions of an upstream component. For example, the gaze annotator module 1014 can defer to decisions of the role ranker module 1012, and the emotion detector module 1016 can defer to the decisions of the role ranker module 1012 or the gaze annotator module 1014.

EXAMPLES

Example 1 is an apparatus for generating real-time director's cuts. The apparatus includes a number of cameras to capture videos of a number of participants in a scene. The apparatus includes a number of microphones to capture audio corresponding to each of the number of participants. The apparatus also includes a role-centric evaluator to receive views-of-participants and a role for each of the participants and rank the views-of-participants based on the roles. Each of the views-of-participants are tagged with one of the participants and rank the extracted view-of-participant streams based on the roles for the participants. The apparatus further includes a view broadcaster to display a highest ranking view-of-participant stream.

Example 2 includes the apparatus of example 1, including or excluding optional features. In this example, voices in the captured audio are tagged with participants that appear in the captured videos.

Example 3 includes the apparatus of any one of examples 1 to 2, including or excluding optional features. In this example, the apparatus includes a speech-centric evaluator to detect an imminent end to a sentence based on intonation or a combination of words. The view broadcaster is to switch to another view-of-participant stream that is determined or prepared after the detection and before the end of the sentence.

Example 4 includes the apparatus of any one of examples 1 to 3, including or excluding optional features. In this example, the apparatus includes a speech pattern detector to detect a speech pattern between the participants and predict an upcoming speaker based on the detected speech pattern.

Example 5 includes the apparatus of any one of examples 1 to 4, including or excluding optional features. In this example, the apparatus includes a gaze-centric evaluator to detect a gaze for a participant in an associated view-of-participant and predict a speaker to follow a current speaker based on the detected gaze of the participant.

Example 6 includes the apparatus of any one of examples 1 to 5, including or excluding optional features. In this example, the apparatus includes a gaze-centric evaluator to detect a gaze for a participant in an associated view-of-participant. A most audience-engaged view-of-participant stream is detected from a set of view-of-participant streams of that participant based on the detected gaze.

Example 7 includes the apparatus of any one of examples 1 to 6, including or excluding optional features. In this example, the apparatus includes an emotion-centric evaluator to detect a normalized emotional response in an emotional participant that exceeds a threshold emotional level. The view broadcaster is to display a view-of-participant corresponding to the emotional participant in addition to or in place of the highest ranking view-of-participant stream.

Example 8 includes the apparatus of any one of examples 1 to 7, including or excluding optional features. In this example, a first participant detected as behaving within the role for the first participant is ranked higher than a second participant that is not behaving within the role for the second participant.

Example 9 includes the apparatus of any one of examples 1 to 8, including or excluding optional features. In this example, the apparatus includes a speaker-to-participant mapper to map voices in the captured audio to participants in the captured videos.

Example 10 includes the apparatus of any one of examples 1 to 9, including or excluding optional features. In this example, the apparatus includes a participant extractor to extract the views-of-participants from the captured videos. The views-of-participants are focused on faces of the participants, bodies of the participants, or both.

Example 11 is a method for generating real-time director's cuts. The method includes receiving, via a processor, audio streams tagged with voices associated with participants in a number of video streams of a scene, and a role for each of the participants. The method also includes extracting, via the processor, view-of-participant streams from the number of streams. The method further includes generating, via the processor, predictive time-based metadata based on the tagged audio streams. The method includes tagging and ranking, via the processor, the extracted view-of-participant streams based on the roles for the participants. The method also further includes and broadcasting, via the processor, a highest ranking view-of-participant stream.

Example 12 includes the method of example 11, including or excluding optional features. In this example, the method includes annotating, via the processor, rankings based on detected gaze of a participant in the extracted views in response to detecting multiple highest ranking views of participant streams.

Example 13 includes the method of any one of examples 11 to 12, including or excluding optional features. In this example, the method includes detecting, via the processor, emotional levels of participants in the extracted view-of-participant streams.

Example 14 includes the method of any one of examples 11 to 13, including or excluding optional features. In this example, the method includes broadcasting a highest-ranked emotionally-expressive view-of-participant stream.

Example 15 includes the method of any one of examples 11 to 14, including or excluding optional features. In this example, the method includes predicting a time to switch to a subsequent view-of-participant stream based on intonation or a combination of words of the participant in the highest ranking view-of-participant stream.

Example 16 includes the method of any one of examples 11 to 15, including or excluding optional features. In this example, the method includes predicting a time to switch to a subsequent view-of-participant stream based on speech of the participants or on a detected speech pattern between the participants.

Example 17 includes the method of any one of examples 11 to 16, including or excluding optional features. In this example, the method includes prioritizing the analysis of the view-of-participant streams based on speech of the participants or on detected speech patterns between the participants.

Example 18 includes the method of any one of examples 11 to 17, including or excluding optional features. In this example, the method includes detecting, via the processor, a normalized emotional response in one of the participants that exceeds a threshold emotional level and displaying a view-of-participant corresponding to the emotional participant in addition to or in place of the highest ranking view-of-participant stream.

Example 19 includes the method of any one of examples 11 to 18, including or excluding optional features. In this example, the method includes detecting a most audience-engaged view-of-participant stream from a set of view-of-participant streams of a participant based on a detected gaze of the participant in the set of view-of-participant streams.

Example 20 includes the method of any one of examples 11 to 19, including or excluding optional features. In this example, the method includes broadcasting multiple shared view-of-participant streams.

Example 21 is at least one computer readable medium for generating real-time director's cuts having instructions stored therein that direct the processor to receive audio streams tagged with voices associated with participants in a number of video streams of a scene, and a role for each of the participants. The computer-readable medium also includes instructions that direct the processor to extract view-of-participant streams from the number of streams. The computer-readable medium further includes instructions that direct the processor to generate predictive time-based metadata based on the tagged audio streams. The computer-readable medium also further includes instructions that direct the processor to tag and rank the extracted view-of-participant streams based on the roles for the participants. The computer-readable medium also includes instructions that direct the processor to broadcast a highest ranking view-of-participant stream.

Example 22 includes the computer-readable medium of example 21, including or excluding optional features. In this example, the computer-readable medium includes instructions that cause the computing device to annotate rankings based on detected gaze of a participant in the extracted views in response to detecting multiple highest ranking views of participant streams.

Example 23 includes the computer-readable medium of any one of examples 21 to 22, including or excluding optional features. In this example, the computer-readable medium includes instructions that cause the computing device to detect emotional levels of participants in the extracted view-of-participant streams.

Example 24 includes the computer-readable medium of any one of examples 21 to 23, including or excluding optional features. In this example, the computer-readable medium includes instructions that cause the computing device to broadcast a highest-ranked emotionally-expressive view-of-participant stream.

Example 25 includes the computer-readable medium of any one of examples 21 to 24, including or excluding optional features. In this example, the computer-readable medium includes instructions that cause the computing device to predict a time to switch to a subsequent view-of-participant stream based on intonation or a combination of words of the participant in the highest ranking view-of-participant stream.

Example 26 includes the computer-readable medium of any one of examples 21 to 25, including or excluding optional features. In this example, the computer-readable medium includes instructions that cause the computing device to predict a time to switch to a subsequent view-of-participant stream based on speech of the participants or on a detected speech pattern between the participants.

Example 27 includes the computer-readable medium of any one of examples 21 to 26, including or excluding optional features. In this example, the computer-readable medium includes instructions that cause the computing device to prioritize the analysis of the view-of-participant streams based on speech of the participants or on detected speech patterns between the participants.

Example 28 includes the computer-readable medium of any one of examples 21 to 27, including or excluding optional features. In this example, the computer-readable medium includes instructions that cause the computing device to detect a normalized emotional response in one of the participants that exceeds a threshold emotional level and display a view-of-participant corresponding to the emotional participant in addition to or in place of the highest ranking view-of-participant stream.

Example 29 includes the computer-readable medium of any one of examples 21 to 28, including or excluding optional features. In this example, the computer-readable medium includes instructions that cause the computing device to detect a most audience-engaged view-of-participant stream from a set of view-of-participant streams of a participant based on a detected gaze of the participant in the set of view-of-participant streams.

Example 30 includes the computer-readable medium of any one of examples 21 to 29, including or excluding optional features. In this example, the computer-readable medium includes instructions that cause the computing device to Example 31 is a system for generating real-time director's cuts. The system includes a number of cameras to capture videos of a number of participants in a scene. The system includes a number of microphones to capture audio corresponding to each of the number of participants. The system includes a role-centric evaluator to receive views-of-participants and a role for each of the participants and rank the views-of-participants based on the roles. Each of the views-of-participants are tagged with one of the participants and rank the extracted view-of-participant streams based on the roles for the participants. The system includes a view broadcaster to display a highest ranking view-of-participant stream.

Example 32 includes the system of example 31, including or excluding optional features. In this example, voices in the captured audio are tagged with participants that appear in the captured videos.

Example 33 includes the system of any one of examples 31 to 32, including or excluding optional features. In this example, the system includes a speech-centric evaluator to detect an imminent end to a sentence based on intonation or a combination of words. The view broadcaster is to switch to another view-of-participant stream that is determined or prepared after the detection and before the end of the sentence.

Example 34 includes the system of any one of examples 31 to 33, including or excluding optional features. In this example, the system includes a speech pattern detector to detect a speech pattern between the participants and predict an upcoming speaker based on the detected speech pattern.

Example 35 includes the system of any one of examples 31 to 34, including or excluding optional features. In this example, the system includes a gaze-centric evaluator to detect a gaze for a participant in an associated view-of-participant and predict a speaker to follow a current speaker based on the detected gaze of the participant.

Example 36 includes the system of any one of examples 31 to 35, including or excluding optional features. In this example, the system includes a gaze-centric evaluator to detect a gaze for a participant in an associated view-of-participant. A most audience-engaged view-of-participant stream is detected from a set of view-of-participant streams of that participant based on the detected gaze.

Example 37 includes the system of any one of examples 31 to 36, including or excluding optional features. In this example, the system includes an emotion-centric evaluator to detect a normalized emotional response in an emotional participant that exceeds a threshold emotional level. The view broadcaster is to display a view-of-participant corresponding to the emotional participant in addition to or in place of the highest ranking view-of-participant stream.

Example 38 includes the system of any one of examples 31 to 37, including or excluding optional features. In this example, a first participant detected as behaving within the role for the first participant is ranked higher than a second participant that is not behaving within the role for the second participant.

Example 39 includes the system of any one of examples 31 to 38, including or excluding optional features. In this example, the system includes a speaker-to-participant mapper to map voices in the captured audio to participants in the captured videos.

Example 40 includes the system of any one of examples 31 to 39, including or excluding optional features. In this example, the system includes a participant extractor to extract the views-of-participants from the captured videos. The views-of-participants are focused on faces of the participants, bodies of the participants, or both.

Example 41 is a system for generating real-time director's cuts. The system includes means for capturing videos of a number of participants in a scene. The system includes means for capturing audio corresponding to each of the number of participants. The system includes means for receiving views-of-participants and a role for each of the participants and ranking the views-of-participants based on the roles. Each of the views-of-participants are tagged with one of the participants and rank the extracted view-of-participant streams based on the roles for the participants. The system includes means for displaying a highest ranking view-of-participant stream.

Example 42 includes the system of example 41, including or excluding optional features. In this example, voices in the captured audio are tagged with participants that appear in the captured videos.

Example 43 includes the system of any one of examples 41 to 42, including or excluding optional features. In this example, the system includes means for detecting an imminent end to a sentence based on intonation or a combination of words. The means for displaying is to switch to another view-of-participant stream that is determined or prepared after the detection and before the end of the sentence.

Example 44 includes the system of any one of examples 41 to 43, including or excluding optional features. In this example, the system includes means for detecting a speech pattern between the participants and predict an upcoming speaker based on the detected speech pattern.

Example 45 includes the system of any one of examples 41 to 44, including or excluding optional features. In this example, the system includes means for detecting a gaze for a participant in an associated view-of-participant and predict a speaker to follow a current speaker based on the detected gaze of the participant.

Example 46 includes the system of any one of examples 41 to 45, including or excluding optional features. In this example, the system includes means for detecting a gaze for a participant in an associated view-of-participant. A most audience-engaged view-of-participant stream is detected from a set of view-of-participant streams of that participant based on the detected gaze.

Example 47 includes the system of any one of examples 41 to 46, including or excluding optional features. In this example, the system includes means for detecting a normalized emotional response in an emotional participant that exceeds a threshold emotional level. The means for displaying is to display a view-of-participant corresponding to the emotional participant in addition to or in place of the highest ranking view-of-participant stream.

Example 48 includes the system of any one of examples 41 to 47, including or excluding optional features. In this example, a first participant detected as behaving within the role for the first participant is ranked higher than a second participant that is not behaving within the role for the second participant.

Example 49 includes the system of any one of examples 41 to 48, including or excluding optional features. In this example, the system includes means for mapping voices in the captured audio to participants in the captured videos.

Example 50 includes the system of any one of examples 41 to 49, including or excluding optional features. In this example, the system includes means for extracting the views-of-participants from the captured videos. The views-of-participants are focused on faces of the participants, bodies of the participants, or both.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for generating real-time director's cuts, comprising:
    at least one camera to capture a video of a plurality of participants in a scene;
    an audio sensor to capture audio corresponding to each of the plurality of participants;
    a role-centric evaluator to receive views-of-participants associated with the video and a role for each of the participants and rank the views-of-participants based on the roles, wherein each of the views-of-participants are tagged with one of the participants, the role-centric evaluator to rank extracted view-of-participant streams based on the roles for the participants, wherein a first participant detected as behaving within the role for the first participant is ranked higher than a second participant that is not behaving within the role for the second participant; and
    a view broadcaster to display a highest ranking view-of-participant stream.

2. The apparatus of claim 1, wherein voices in the captured audio are tagged with participants that appear in the captured video.

3. The apparatus of claim 1, further including a speech-centric evaluator to detect an imminent end to a sentence based on at least one of intonation or a combination of words, wherein the view broadcaster is to switch to another view-of-participant stream that is at least one of determined or prepared after the detection of and before the imminent end of the sentence.

4. The apparatus of claim 1, further including a speech pattern detector to detect a speech pattern between the participants and predict an upcoming speaker based on the detected speech pattern.

5. The apparatus of claim 1, further including a gaze-centric evaluator to detect a gaze for a participant in an associated view-of-participant and predict a speaker to follow a current speaker based on the detected gaze of the participant.

6. The apparatus of claim 1, further including a gaze-centric evaluator to detect a gaze for a participant in an associated view-of-participant, wherein a most audience-engaged view-of-participant stream is detected from a set of view-of-participant streams of that participant based on the detected gaze.

7. The apparatus of claim 1, further including an emotion-centric evaluator to detect a normalized emotional response in an emotional participant that exceeds a threshold emotional level, wherein the view broadcaster is to display a view-of-participant corresponding to the emotional participant in addition to or in place of the highest ranking view-of-participant stream.

8. The apparatus of claim 1, further including a speaker-to-participant mapper to map a voice in the captured audio to a participant in the captured video.

9. The apparatus of claim 1, further including a participant extractor to extract the views-of-participants from the captured video, wherein the views-of-participants are focused on at least one of faces of the participants or bodies of the participants.

10. A method for generating real-time director's cuts, comprising:
receiving, via a processor, audio streams tagged with voices associated with participants in a video stream of a scene, and a role for each of the participants;
extracting, via the processor, view-of-participant streams from the video stream;
generating, via the processor, predictive time-based metadata based on the tagged audio streams;
tagging and ranking, via the processor, the extracted view-of-participant streams based on the roles for the participants, wherein a first participant detected as behaving within the role for the first participant is ranked higher than a second participant that is not behaving within the role for the second participant; and
broadcasting, via the processor, a highest ranking view-of-participant stream.

11. The method of claim 10, further including annotating, via the processor, rankings based on a detected gaze of a participant in the extracted view-of-participant streams in response to detecting multiple highest ranking views of participant streams.

12. The method of claim 10, further including detecting, via the processor, emotional levels of a participant in the extracted view-of-participant streams.

13. The method of claim 10, further including broadcasting a highest-ranked emotionally-expressive view-of-participant stream.

14. The method of claim 10, further including predicting a time to switch to a subsequent view-of-participant stream based on at least one of intonation or a combination of words of a participant in the highest ranking view-of-participant stream.

15. The method of claim 10, further including predicting a time to switch to a subsequent view-of-participant stream based on at least one of speech of the participants or on a detected speech pattern between the participants.

16. The method of claim 10, further including prioritizing an analysis of the view-of-participant streams based on at least one of speech of the participants or on detected speech patterns between the participants.

17. The method of claim 10, further including detecting, via the processor, a normalized emotional response in one of the participants that exceeds a threshold emotional level and displaying a view-of-participant stream corresponding to at least one of an emotional participant or the highest ranking view-of-participant stream.

18. The method of claim 10, further including detecting a most audience-engaged view-of-participant stream from a set of view-of-participant streams of a participant based on a detected gaze of the participant in the set of view-of-participant streams.

19. The method of claim 10, further including broadcasting multiple shared view-of-participant streams.

20. At least one non-transitory computer readable medium for generating real-time director's cuts having instructions stored therein that, in response to being executed on a computing device, cause the computing device to:
receive audio streams tagged with voices associated with participants in a video stream of a scene, and a role for each of the participants;
extract view-of-participant streams from the video stream;
generate predictive time-based metadata based on the tagged audio streams;
tag and rank the extracted view-of-participant streams based on the roles for the participants, wherein a first participant detected as behaving within the role for the first participant is ranked higher than a second participant that is not behaving within the role for the second participant; and
broadcast a highest ranking view-of-participant stream.

21. The at least one non-transitory computer readable medium of claim 20, further including instructions to cause the computing device to annotate rankings based on detected gaze of a participant in the extracted view-of-participant streams in response to detecting multiple highest ranking views of participant streams.

22. The at least one non-transitory computer readable medium of claim 20, further including instructions to cause the computing device to detect emotional levels of participants in the extracted view-of-participant streams.

23. The at least one non-transitory computer readable medium of claim 20, further including instructions to cause the computing device to broadcast a highest-ranked emotionally-expressive view-of-participant stream.

24. The at least one non-transitory computer readable medium of claim 20, further including instructions to cause the computing device to predict a time to switch to a subsequent view-of-participant stream based on at least one of intonation or a combination of words of a participant in the highest ranking view-of-participant stream.

* * * * *